United States Patent [19]

Casey et al.

[11] Patent Number: 4,672,445

[45] Date of Patent: Jun. 9, 1987

[54] PROGRESSIVE SCAN PROCESSOR EMPLOYING INTERPOLATION IN LUMINANCE CHANNEL CONTROLLED BY A MOTION SIGNAL AND A VERTICAL DETAIL REPRESENTATIVE SIGNAL

[75] Inventors: Robert F. Casey, Burgen County; Hermann J. Weckenbrock, Bordentown Township, Burlington County, both of N.J.

[73] Assignee: RCA Corporation, Princeton, N.J.

[21] Appl. No.: 738,974

[22] Filed: May 29, 1985

[51] Int. Cl.[4] .................. H04N 11/20; H04N 7/01
[52] U.S. Cl. ........................... 358/140; 358/11
[58] Field of Search .............. 358/11, 140, 21 R

[56] References Cited

U.S. PATENT DOCUMENTS

| 4,400,719 | 8/1983 | Powers | 358/21 R |
| 4,415,931 | 11/1983 | Dischert | 358/242 |
| 4,426,661 | 1/1984 | Okada et al. | 358/140 |
| 4,498,099 | 2/1985 | Pritchard | 358/31 |
| 4,558,347 | 12/1985 | Pritchard et al. | 358/11 |
| 4,598,309 | 7/1986 | Casey | 358/11 |

FOREIGN PATENT DOCUMENTS

| 1525915 | 9/1978 | United Kingdom . |
| 2050109 | 12/1980 | United Kingdom . |
| 2111343 | 6/1983 | United Kingdom . |
| 2111797 | 7/1983 | United Kingdom . |

OTHER PUBLICATIONS

"High Quality Television by Signal Processing" by Broder Wendland, Nov. 1983.
BBC Research Report 1983/8 "The Improved Display of 625–line Television Pictures" A. Roberts pub. Jul. 1983.

*Primary Examiner*—James J. Groody
*Assistant Examiner*—Robert Michael Bauer
*Attorney, Agent, or Firm*—P. J. Rasmussen; P. M. Emanuel; R. G. Coalter

[57] ABSTRACT

A frame comb filter separates a luminance signal from a composite video input signal for display on every other line of a progressively scanned display. The filter includes a tap for providing a field delayed luma signal and an interpolator for providing a frame comb filtered and interpolated luma signal. A selector switch selects the field delayed luma signal for display on the intermediate lines of the display when the vertical detail content of the input signal is greater than a minimum threshold value and there is little or no interframe motion and selects the frame comb filtered and interpolated luminance signal for display otherwise thereby providing enhanced vertical detail and reduced field motion artifacts for displayed images.

10 Claims, 4 Drawing Figures

| LINE | N | | N+1 | |
|---|---|---|---|---|
| WRITE | Y1, Y2, C | | Y1, Y2, C | |
| READ | Y2 OF N-1 | Y1 OF N-1 | Y2 OF N | Y1 OF N |
| | C OF N-1 | C OF N-1 | C OF N | C OF N |

PROGRESSIVE SCAN PROCESSOR EMPLOYING INTERPOLATION IN LUMINANCE CHANNEL CONTROLLED BY A MOTION SIGNAL AND A VERTICAL DETAIL REPRESENTATIVE SIGNAL

This invention relates to video signal processors for progressive scan video systems of the type that convert line-rate interlaced video signals into double line-rate non-interlaced video signals and wherein added lines are obtained by interpolation.

BACKGROUND OF THE INVENTION

"Progressively" scanned television receivers have been proposed wherein the horizontal scan rate is multiplied, i.e., doubled, and each line of video is displayed twice thereby providing a displayed image having reduced visibility of line structure. In one form of a progressively scanned receiver, each line of video is stored in one of two memories. As a first of the memories is being written with the incoming video signal at a standard line rate, the second of the memories is read two-times at twice the standard line rate thereby providing two lines of "speed-up" (time-compressed) video within one standard line interval. The second memory output is applied to a display having a doubled horizontal sweep rate synchronized with read-out of the memory thereby doubling the number of displayed lines of video singal. An example of such a progressively scanned receiver, wherein the added lines of video signal are replicas of the original scan lines, is described in U.S. Pat. No. 4,415,931 entitled TELEVISION DISPLAY WITH DOUBLED HORIZONTAL LINES which issued Nov. 15, 1983 to R. A. Dischert.

In another form of progressive scan system, the "extra" lines for display are obtained by interpolation of adjacent vertical lines of the incoming video signal. This may be done either before or after "speed-up" (i.e., time compressing) of the video signal in the memory. An example of a progressively scanned display system in which the additional scan lines are obtained by interpolation from the original scan lines prior to time compression or video "speed-up" is described by K. H. Powers in U.S. Pat. No. 4,400,719 entitled TELEVISION DISPLAY SYSTEM WITH REDUCED LINE SCAN ARTIFACTS which issued Aug. 23, 1983. An alternative of providing interpolation subsequent to speed-up of the video signal is described by Yasushi Fujimura et al. in U.K. Patent Application No. 2,111,343A published June 29, 1983.

It has been recognized (by Powers, for example) that a superior progressive scan image may be obtained in cases where there is no significant scene motion, by using a field memory to delay the incoming video signal by one field. In this way, all 525 lines of an interlaced frame (NTSC assumed) are available for display during each field period thereby avoiding the loss of vertical resolution characteristic of conventional line interpolators. When motion occurs, however, the temporal difference (1/60th. Sec. for NTSC) between the undelayed and field delayed line causes the edges of moving objects to appear serrated.

The serrated edge effect may be corrected as described by Casey in U.S. Pat. No. 4,598,309 filed May 29, 1984 entitled A TELEVISION RECEIVER THAT INCLUDEDS A FRAME STORE USING NON-INTERLACED SCANNING FORMAT WITH MOTION COMPENSATION, commonly asssigned to the assignee of the present invention. In an exemplary embodiment of the Casey apparatus, a frame comb filter is used to delay the incoming composite video signal by one field and to provide a frame comb filtered luminance signal and a motion signal. The chrominance component is removed from the field delayed signal and the resultant luminance component is displayed on alternate lines of a display independently of whether or not motion exists in the scene. The intermediate lines of the display are provided by means of a motion responsive switch that selects the frame comb filtered luminance signal for display during times when little or no motion is present and selects the field-delayed luminance signal (which, additionally, is line-comb filtered) for display otherwise.

SUMMARY OF THE INVENTION

It is recognized herein that a need exists for further enhancement of the vertical detail characteristics of progressive scan processors and in particular the need is recognized for adaptively processing luminance signals for display as a function of the vertical detail content of the signal being processed.

A progressive scan processor embodying the invention includeds a filter means for receiving an interlaced composite video input signal and providing a plurality of output signals inclusive of: a frame comb filtered and line interpolated luminance output signal; a field delayed luminance output signal; and a vertical detail representative output signal. A selection means, coupled to the filter means and responsive to the vertical detail representative signal, selectively couples the frame comb filtered line interpolated luminance output signal or the field delayed luminance output signal to an output means in accordance with the magnitude of said vertical detail representative signal.

In accordance with a further aspect of the invention, the processor further includes motion detector means coupled to the filter means for providing a motion indicating signal. A logic means, in the selection means, causes the selection means to couple the field delayed luminance output signal to the output means when the motion signal is indicative of little or no motion and the vertical detail representative signal concurrently exceeds a minimum threshold and causes the selection means to couple the interpolated luminance signal to the output means otherwise.

BRIEF DESCRIPTION OF THE DRAWING

The invention is illustrated in the accompanying drawing wherein like elements are denoted by like reference designators and in which.

DETAILED DESCRIPTION

Figure 1:
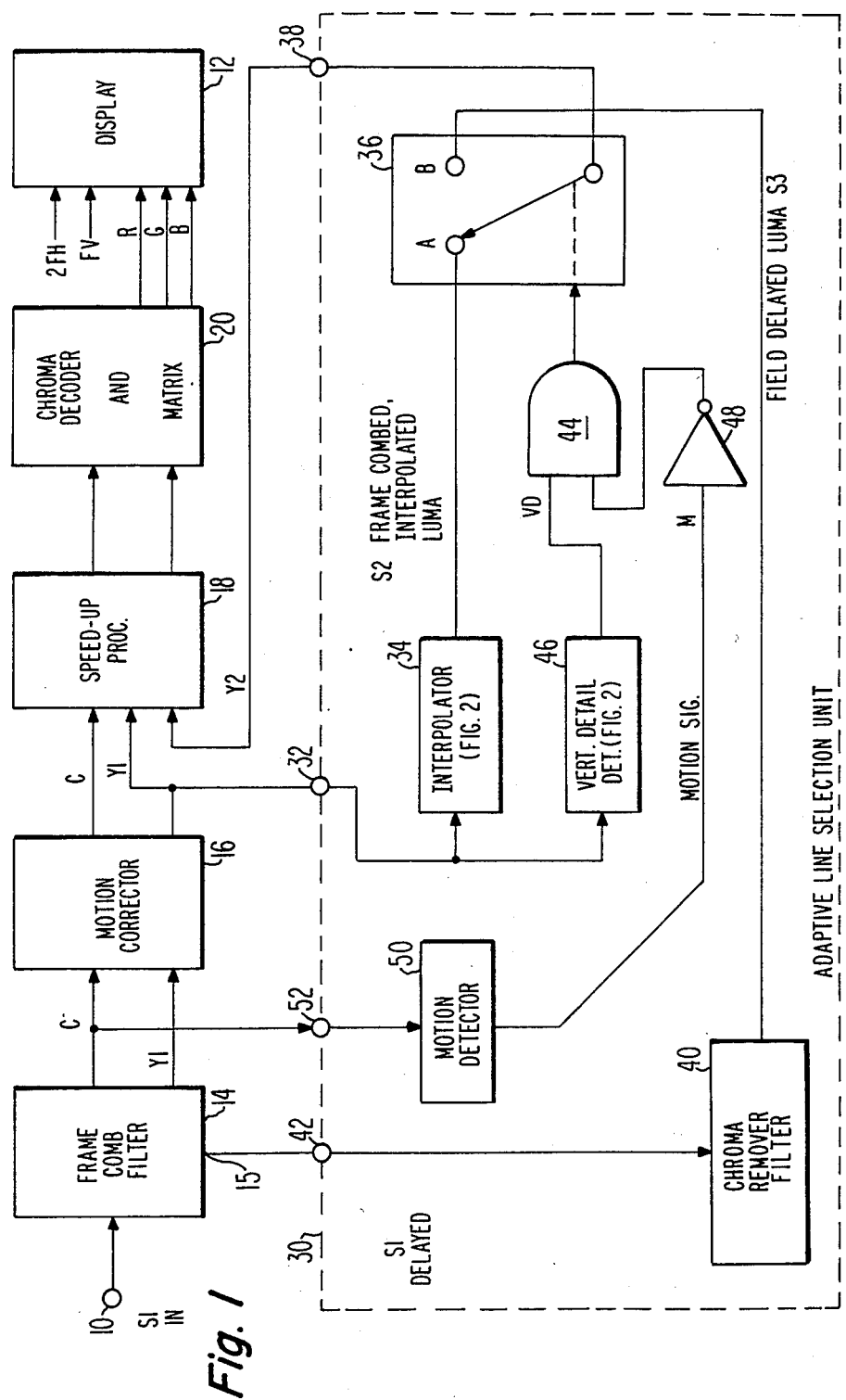
FIG. 1 is a block diagram of a progressive scan processing system embodying the invention.

The progressive scan system of FIG. 1 includes an input terminal 10 for connection to a source of interlaced composite video input signals to be converted and displayed on display unit 12 in progressive scan form. The source (not shown) may comprise a television signal tuner, a video tape recorder (time base corrected) or some other suitable source of baseband interlaced composite video signals. It will be assumed herein that the video input signal (S1) is a standard NTSC format signal. It will be appreciated that the principles of the invention apply to other interlaced composite video formats (e.g., PAL).

Figure 4:
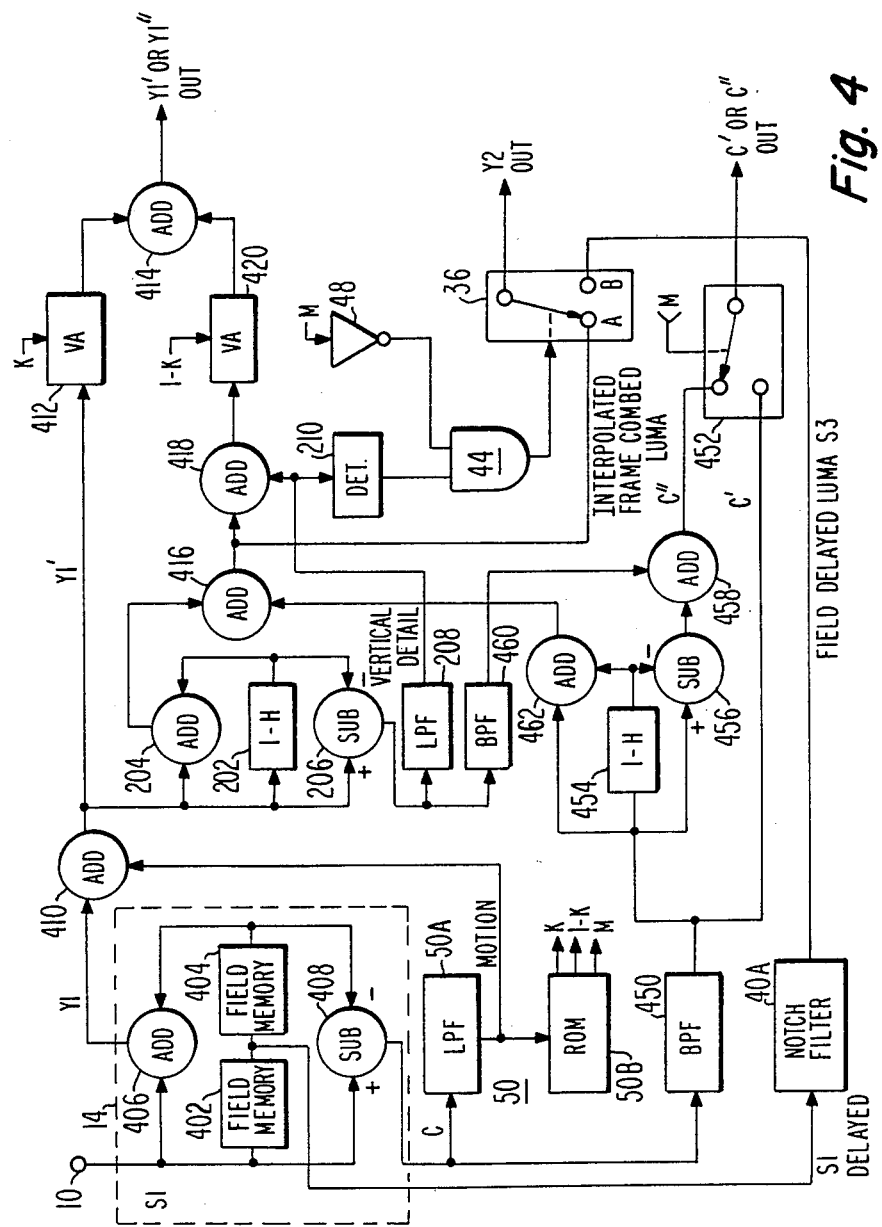
FIG. 4 is a detailed block diagram of portions of the system of FIG. 1.

Input terminal 10 is coupled to a frame comb filter 14 which filters signal S1 and provides frame comb filtered chrominance (C) and luminance (Y1) output signals. As is known, a frame comb filter provides nearly ideal separation of a composite video signal into component form in the absence of frame to frame (i.e., inter-frame) motion. Motion artifacts or "contaminants" are removed, in large part, by means of a motion corrector unit 16. Pritchard describes a suitable form of motion corrector for a frame comb filter in U.S. Pat. No. 4,498,099 entitled APPARATUS FOR FRAME-TO-FRAME COMB FILTERING COMPOSITE VIDEO SIGNAL which issued Feb. 5, 1985. Weckenbrock describes improvements in motion correction in comb filters in U.S. Pat. No. 4,617,589 entitled ADAPTIVE FRAME COMB FILTER SYSTEM filed Dec. 17, 1984, assigned to the assignee of the present invention and incorporated herein by references. Relevant details of the Weckenbrock system are shown in FIG. 4 herein.

Figures 2, 3:
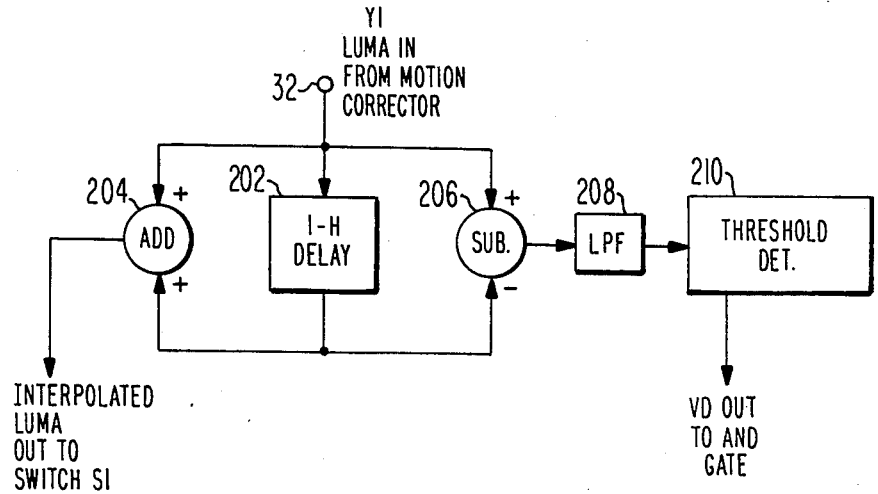
FIG. 2 is a block diagram of a portion of the system of FIG. 1
FIG. 3 is a table illustrative operation of the system of FIG. 1.

After motion correction in unit 16, the luminance Y1 and chrominance C signals are applied along with a further luminance signal Y2 (processed as will be described) to a video speed-up processor 18 of conventional design which "speeds-up" (i.e., time compresses) the video signal by a factor of two. A suitable implementation of unit 18 is described in the aforementioned Casey application and in the Powers patent. The table of FIG. 3 provides a detailed listing of the video speed-up operation. As shown, as a given line is being received (e.g., line "N") unit 18 stores or "writes" signals Y1, Y2 and C in memory. Concurrently, the signals Y2 and C previously store (line N-1) are recovered or "read" from memory during the first half of the line N period. During the second half of the line N period the signals Y1 and C of line N-1 are recovered from memory. This process is repeated during the next horizontal line interval N+1 when the previously stored line N signals are recovered.

As shown, the chroma signal is time compressed and repeated during one line interval. Alternatively, as described by Casey, alternate lines of the chroma signal may be interpolated if desire. The luma signals Y1 and Y2 are time compressed and interleaved so that signal Y1 and Y2 alternate line-by-line when displayed. The speeded-up signals are applied to conventional chroma decoder and matrix circuits (block 20) which supply RGB output signals in progressive scan form to a conventional display unit 12 which receives a double line-rate horizontal drive signal (2FH) and normal field rate vertical drive signal (FV). Accordingly, for NTSC input signals, unit 12 displays a raster of 525 lines per field with the luminance component of the RGB signals alternating line by line between Y1 and Y2 as shown in FIG. 3.

Luminance signal Y2 is provided by an adaptive line selection unit 30 (outlined in phantom) which, in accordance with an aspect of the invention, enhances the vertical detail content of signal Y2 as a function of the vertical detail content of the video input signal S1. Additionally, the enhancement is also a function of field-to-field motion content of signal S1 such that, for a certain combination of detail and motion content, the signal Y2 exhibits essentially the full resolution of the luminance content of the video input signal S1.

Unit 30 includes an input 32 for receiving the (motion corrected) frame comb filtered luminance signal Y1 and an interpolator 34 coupled to terminal 32 for providing a frame comb filtered and interpolated luminance output signal S2. Interpolator 34, in this specific example of the invention, comprises a two-point linear interpolator which averages the picture elements ("pixels") of adjacent horizontal lines of signal Y1. This function may be implemented as shown in FIG. 2 where a one-line (1-H) delay unit 202 is connected to terminal 32 for delaying luma signal Y1 by one horizontal line and an adder 204 is used to combine the delayed and non-delayed signals to form the frame comb filtered and interpolated luma output signal S2.

Signal S2 is coupled via a switch 36 to an output 38 for application to speed-up processor 18 as the luminance signal Y2 when the switch 36 is in the position ("A") as shown. Accordingly, when signals Y1 and Y2 are displayed on unit 12, the frame comb filtered luminance signal Y1 is interleaved, line-by-line, with the frame comb filtered and interpolated luminance signal S2. This display mode (namely, Y1-S2-Y1-S2, etc.) is used whenever there is either significant motion present in the displayed scene or when there is no substantial "vertical detail" present (i.e., the line-to-line luminance signal level variations are less than a threshold value).

It is a feature of the invention that the interpolated luminance signal S2 is not used for display with signal Y1 when vertical detail is present and the scene content is more or less stationary. Under this condition switch 36 is changed from position "A" to position "B" to couple a field-delayed luminance signal S3 to terminal 38, thereby substituting signal S3 for signal S2. Since signal S3 is only subjected to delay and is not interpolated, it possesses the full vertical resolution of the composite video input signal S1 and therefore provides improved vertical resolution when displayed with signal Y1 on unit 12. This "automatic changeover" between signal S2 and S3 advantageously avoids field motion related artifacts (e.g., serrated edges in moving objects) in the displayed image while also maintaining the full vertical resolution of the video input signal (for detailed stationary objects) and removing the frame rate (e.g., 30 Hz) line "twitter" characteristic of interlaced signals.

The field delayed luminance signal S3 is derived from the composite video input signal S1 by means of a field tap 15 of frame comb filter 14. The field tap may be provided, as shown in FIG. 4, by using a pair of cascade connected field memories (402, 404) to provide the frame delay needed for frame comb filter 14. Since the signal at tap 15 corresponds to composite video input signal S1 delayed by substantially one field, it is necessary to remove the chrominance component to produce the field delayed luminance signal S3. This function is provided by chroma remover filter 40 coupled to tap 15 via and input 42. Filter 40 may comprise, illustratively, a low pass filter having an upper cut-off or "corner" frequency below the lowest chroma subcarrier sideband. Alternatively, filter 40 may comprise a notch filter having a center frequency set to the color subcarrier frequency. A notch filter, or some other suitable filter having a relatively high rejection at the color subcarrier frequency, is preferred in order to minimize the appearance of so-called "hanging dots" in displayed images due to imperfect removal of the chrominance component. Hanging dots are a particular problem when using line-delay type comb filters for Y-C separation. If such a fliter is used as filter 40 then some form of additional filtering (e.g., notch filtering) should be added to obtain maximum suppression of such an artifact.

Switch 36 is controlled by and AND gate 44 having a first input coupled to receive a vertical detail signal, VD, provided by a vertical detail signal detector 46 and a second input coupled via an inverter 48 to the output of a motion detector 50. Detector 46 has an input coupled to terminal 52 for receiving signal "C" and may be implemented as shown, for example, in FIG. 2 in which the frame comb filtered luma signal Y1 is line comb fltered by 1-H delay unit 202 and a subtractor 206. The subtractor output is low pass filtered by filter 208 to remove residual chroma components not removed by the frame comb filter 14 and applied to a threshold detector 210 which produces a HIGH output signal level when the vertical detail representative signal (i.e., the output of filter 208) exceeds the threshold level of detector 210. A suitable threshold setting would correspond to a samll fraction of the overall luminance signal range (e.g., a few percent or so) to provide adequate rejection of noise which may accompany the luma signal. Detector 210 may be implemented as a level detector if the signals are processed in analog form. Where digital processing is used, detector 210 may be implemented by means of a binary comparator or a suitably programmed read-only-memory (ROM).

Motion detector 50 has an input coupled via terminal 52 to receive the frame comb filtered chrominance signal output of filter 14. Detector 50 may be implemented (as shown in FIG. 4) by means of a cascade connection of a low pass filter 50A and a read only memory (ROM) 50B (or other sitable threshold detector). The low pass filter 50A removes chroma related components from the chroma output of flter 14 leaving only a frame to frame motion related compoent. ROM 50B serves as a threshold detector and produces a HIGH output level for the motion signal M when the motion signal exceeds a minimum level. The threshold setting may be, as in the case of the vertical detail detector, a small percentage of the full scale input signal range (e.g., a few percent or so).

Gate 44 is enabled when two conditions are met, namely, when the vertical detail signal is HIGH (signifying the presence of vertical detail above a minimum value) and the motion signal M is LOW (signifying substantially no motion). When enabled, gate 44 places switch 36 in position "B" thereby supplying the field delayed luminance signal S3 to speed-up processor 18 as signal Y2. For all other combinations of signals VD and M, gate 44 is disabled thereby placing switch 36 in position "A" which then supplies the frame comb filtered and interpolated luminance signal S2 to processor 18 as signal Y2. The visual effect on display 12 is that still or slowly changing scenes having at least a minimum cf vertical detail are displayed with the full vertical resolution of the composite video input signal with essentially no degradation due to comb filtering or interpolation and no interline flicker or "twitter". Where there is little or no vertical detail present or where motion is present, the interpolated signal S2 is used for Y2 thus avoiding motion artifacts.

Frame comb filter 14, motion corrector 16 and adaptive line selection unit 30 may be implemented as shown in FIG. 4, portions of which have been previously discussed. In this specific implementation, some of the elements of unit 30 and corrector 16 are shared in common so as to provide dual functions and decrease the parts count thus improving reliability while reducing the overall cost. Frame comb filter 14 (outlined in phantom) provides the dual functions of frame comb filtering the composite video input signal S1 to provide luma/chroma separation and delaying S1 by one field interval as previously explained. Filter 14 comprise a pair of cascade connected field memories 402 and 404 which receive signal S1 and provide signal S1 delayed by one field at the common connection thereof (e.g., at tap 15). The output of memory 404 is applied to an adder 406 and a subtractor 408 which provides the frame comb filtered luminance and chrominance signals Y1 and C, respectively.

The motion signal provided by filter 50A of the motion detector 50 (previously discussed is added by means of an adder 410 to signal Y1 to provide a first order of motion correction to signal Y1 which tends to minimize the appearance of double images when motion is present. This signal Y1' is applied via a motion dependent variable attenuator (VA) 412 to one input of an adder 414 controlled by a motion indicating signal K. Signal Y1' is also applied, via a line comb filter (202/204), two adders (416,418) and a further variable attenuator 420, to the other input of adder 414 which provide additional motion correction and vertical detail enhancement to signal Y1' to generate signal Y1". Specifically, the line comb flter (202, 204 of FIG. 2) reduces residual motion induced chrominance components from Y1'. Adder 416 restores high frequency luminance components (obtained from the chroma channel) to reduce motion induced ghosts and adder 418 restores vertical detail lost in the line comb filter (202/204) by adding the vertical detail signal prpvided by filter 208. Attenuators 412 and 420 selectively couple signals Y1' and Y1" to adder 414 for display on unit 12 as signal Y1. The selection is controlled by ROM 50B which generates the attenuator control signal K and 1-K as well as the motion indicator signal M. When there is no motion K=1 and 1-K=0, therefore the output signal equals Y1. As the magnitude of motion increases, K decreases and 1-K increases therefore causing the output sgnal to "fade" to Y1", so to speak, in proportion to the motion content. This "soft" switching action provides a smooth blend between the partially motion cmpensated signal Y1' and the more fully motion compensated signal Y1". Alternatively, where such motion dependent blending is not required, elements 412, 414 and 420 may be replaced by a "hard" switch controlled by the motion signal M from ROM 50B to select Y1' for M=0 (no substantial motion) or Y1" if M=1.

In motion correcting the chroma signal C, the output of subtractor 408 is bandpass filtered in filter 450 and applied to one terminal of a motion responsive switch 452 controlled by the motion signal M to couple the filtered signal C' to speed-up processor 18 when M=0 (signifying little or no motion). Signal C' is also applied to a line comb filter comprising a 1-H delay line 454 and a subtractor 456 which removes residual motion induced artifacts (i.e., residual luminance components) from signal C'. An adder 458 adds a color vector correction signal (obtained via a chroma band pass filter 460 from subtractor 206) to the line comb filtered chroma signal (C") to provide hue correction for color shifts due to motion. When motion is present (M=1), switch 452 selects the signal C" for application to speed-up processor 18.

The high frequency luma motion correction signal added to signal Y1' in adder 416 is obtained from the chroma channel by an adder 462 coupled to delay line 454 in the chroma channel. Adder 462 and delay line 454 thus serve as a line comb filter which detects residual motion induced luminance components in the chroma channel for generating the "fine detail" luma motion correction signal.

The remaining elements of FIG. 4 (namely, detector 210, inverter 48, gate 44 and switch 36) provide the same functions of selction of the Y2 output signal as described in connection with FIGS. 1, 2 and 3. It will be noted, however, that in FIG. 4 filter 208 provides the dual functions of both vertical detail correction of signal Y1" and control of gate 44 as a function of vertical detail. Also a separate interpolator is not required since the interpolator formed by elements 202 and 204 serves both adder 418 in the Y1" channel and switch 36 in the Y2 channel.

What is claimed is:

1. A progressive scan system, comprising:
   filter means for receiving and interlaced composite video input signal and providing a frame-comb filtered luminance output signal, a field-delayed luminance output signal, a line-interpolated frame-comb filtered luminance output signal, a motion indicating signal and a vertical detail representative signal;
   signal selection means, responsive to said motion indicating and vertical detail representative signals, for selecting one of said field-delayed luminance signal and said line-interpolated frame-comb filtered luminance output signals for display; and
   raster scan display means, coupled to said filter means and to said selection means, for displaying said selected luminance signal on every other horizontal line of said display means.

2. A progressive scan system as recited in claim 1 wherein said signal selection means comprises:
   logic means for causing said selection means to select said field-delayed luminance output signal for application to said display means when said motion indicating signal indicates no substantial motion and said vertical detail representative signal concurrently indicates the presence of vertical detail in excess of a minimum value, and for causing said selection means to select said line-interpolated frame-comb filtered luminance signal for application to said display otherwise.

3. A progressive scan system as recited in claim 1 further comprising:
   second signal selection means, responsive to said motion indicating signal, for selectively coupling one of said frame-comb filtered luminance signal and said line-interpolated frame-comb filtered luminance signals to said display means for display in line-interleaved fashion with said first selected luminance signal.

4. A progressive scan system, comprising:
   frame comb filter means for receiving a composite video input signal and providing a frame comb filtered luminance output signal, a field-delayed luminance output signal, and a motion indicating signal;
   line comb filter means, responsive to said frame comb filtered luminance signal, for providing a line and frame comb filtered luminance output signal and a vertical detail representative output signal;
   first signal selection means, responsive to said motion indicating signal for selectively coupling one of said frame comb filtered luminance signal and said line and frame comb filtered luminance output signals, to a first output means;
   second signal selection means, jointly responsive to said motion indicating signal and to said vertical detail representative signal for selectively coupling one of said field delayed luminance signal and said line and frame comb filtered luminance signal, to a second output means; and
   raster scan display means, coupled to said output means, for displaying the luminance signals selected by said first and second selection means on alternate lines of said display means.

5. A progressive scan system as recited in claim 4 wherein said second signal selection means comprises logic means for selecting said field delayed luminance signal for display in response to the simultaneous occurrence of said vertical detail signal exceeding a minimum value and said motion signal being below a threshold value indicative of relatively little inter-frame motion.

6. A progressive scan processor, comprising:
   first filter means for receiving an interlaced composite video input signal and providing a frame comb filtered luminance output signal and a field delayed luminance output signal;
   second filter means, coupled to said first filter means and responsive to said frame comb filtered luminance output signal, for providing an interpolated luminance output signal;
   third filter means, coupled to said first filter means, for line-comb filtering said frame-comb filtered luminance output signal to provide a vertical detail representative output signal;
   an output means; and
   selection means, responsive to said vertical detail representative signal, for selectively coupling one of said field delayed luminance output signal and said interpolated luminance output signal to said output means.

7. A progressive scan processor as recited in claim 6 further comprising:
   motion detector means, coupled to said first filter means, for providing a motion and non-motion indicating signal; and
   logic means in said selection means for causing said selection means to couple said field delayed luminance output signal to said output means when said motion signal is indicative of little or no motion and said vertical detail representative signal exceeds a minimum threshold and for causing said selection means to couple said interpolated luminance signal to said output means otherwise.

8. A progressive scan processor as recited in claim 6 wherein said second and third filter means comprise a line-comb filter means having a first output for providing said interpolated luminance signal and a second output coupled to a low-pass filter for providing said vertical detail representative signal, respectively, and wherein said progressive scan processor further comprises means for adding said vertical detail representative signal to said frame comb filtered luminance output signal to provide a modified luminace output signal.

9. A progressive scan processor, comprising:

frame comb filter means for separating an interlaced composite video signal into a luminance component and a chrominance component, said frame comb filter means also having an output tap for providing a field delayed composite video output signal;

means, coupled to said tap, for suppressing the chrominance component of said field delayed composite video output signal to provide a field delayed luminance output signal substantially devoid of said chrominance component;

interpolator means, responsive to said luminance component, for providing an interpolated luminance output signal;

vertical detail filter means, coupled to said frame comb filter means, for providing a vertical detail representative output signal;

motion detector means, coupled to said frame comb filter means, for providing a motion indicating signal;

output means; and circuit means for selectively coupling one of said field-delayed luminance output signal and said interpolated luminance output signal to said output means in response to said vertical detail representative signal and the motion indicating signal.

10. A progressive scan processor as recited in claim 9 wherein said circuit means includes logic means in said circuit means for causing said circuit means to couple said field delayed luminance output signal to said output means when said motion signal is of a value indicative of non-motion and said vertical detail representative signal exceeds a minimum threshold and for causing said circuit means to couple said interpolated luminance signal to said output means otherwise.

* * * * *